United States Patent
Campbell et al.

(10) Patent No.: US 9,170,684 B2
(45) Date of Patent: Oct. 27, 2015

(54) OPTICAL NAVIGATION DEVICE

(75) Inventors: Colin Campbell, Motherwell (GB);
Hazel McInnes, Dunfermline (GB);
Jeffrey Raynor, Edinburgh (GB);
Mathieu Reigneau, Amilly (FR)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 916 days.

(21) Appl. No.: 13/214,326

(22) Filed: Aug. 22, 2011

(65) Prior Publication Data

US 2012/0138778 A1   Jun. 7, 2012

(30) Foreign Application Priority Data

Aug. 23, 2010   (GB) .................................... 1014053.1
Dec. 21, 2010   (GB) .................................... 1021638.0

(51) Int. Cl.
| | |
|---|---|
| *G01J 1/04* | (2006.01) |
| *G06F 3/042* | (2006.01) |
| *G06F 3/0346* | (2013.01) |
| *G06F 3/03* | (2006.01) |
| *G06F 1/16* | (2006.01) |
| *G06F 3/0354* | (2013.01) |

(Continued)

(52) U.S. Cl.
CPC ............ *G06F 3/0425* (2013.01); *G02B 6/4214* (2013.01); *G06F 1/169* (2013.01); *G06F 3/0317* (2013.01); *G06F 3/0338* (2013.01); *G06F 3/0346* (2013.01); *G06F 3/0354* (2013.01); *G06F 3/03547* (2013.01); *G06F 3/042* (2013.01); *G06F 2203/04109* (2013.01)

(58) Field of Classification Search
CPC ........ G02B 6/4214; G02B 6/43; G02B 6/043; G06F 1/169; G06F 3/0317; G06F 3/0338; G06F 3/0346; G06F 3/0354; G06F 3/03547; G06F 3/042
USPC .............. 250/227.11; 345/166, 173, 175, 176
See application file for complete search history.

(56) References Cited

U.S. PATENT DOCUMENTS 5,038,208 A * 8/1991 Ichikawa et al. ............... 358/502
5,296,724 A * 3/1994 Ogata et al. ..................... 257/98
(Continued)

FOREIGN PATENT DOCUMENTS

| CN | 101000408 | 7/2007 |
|---|---|---|
| CN | 101488059 | 7/2009 |

(Continued)

OTHER PUBLICATIONS

"Frustrated Total Internal Reflection (FTIR)," NUI Group Community Wiki, Feb. 18, 2011, 4 pages.
(Continued)

*Primary Examiner* — Georgia Y Epps
*Assistant Examiner* — Kevin Wyatt
(74) *Attorney, Agent, or Firm* — Allen, Dyer, Doppelt, Milbrath & Gilchrist, P.A.

(57) ABSTRACT

An optical navigation device may include an image sensor with an imaging surface, a laser, and an optical waveguide layer having an exposed user surface and a total internal reflection (TIR) surface on the underside of the exposed user surface. The waveguide layer, the laser, and the image sensor may be together arranged to direct radiation emitted by the laser onto the imaging surface at least partly by total internal reflection by the TIR surface.

31 Claims, 10 Drawing Sheets

(51) Int. Cl.
*G02B 6/42* (2006.01)
*G06F 3/0338* (2013.01)

(56) References Cited

U.S. PATENT DOCUMENTS

| | | | |
|---|---|---|---|
| 7,447,243 B2 * | 11/2008 | Aoshima et al. | 372/21 |
| 7,719,517 B2 * | 5/2010 | Larsen et al. | 345/163 |
| 2006/0114237 A1 | 6/2006 | Crockett et al. | 345/173 |
| 2007/0052684 A1 * | 3/2007 | Gruhlke et al. | 345/173 |
| 2007/0109784 A1 | 5/2007 | Kosnik et al. | |
| 2008/0029691 A1 | 2/2008 | Han | |
| 2008/0062149 A1 * | 3/2008 | Baruk | 345/175 |
| 2008/0179507 A2 | 7/2008 | Han | 250/224 |
| 2009/0153519 A1 * | 6/2009 | Suarez Rovere | 345/173 |
| 2009/0267919 A1 | 10/2009 | Chao et al. | 345/175 |
| 2010/0079408 A1 | 4/2010 | Leong et al. | 345/175 |
| 2010/0079409 A1 | 4/2010 | Sirotich et al. | |
| 2012/0199728 A1 * | 8/2012 | Momtahan | 250/221 |
| 2013/0201156 A1 * | 8/2013 | Picciotto et al. | 345/175 |
| 2014/0028556 A1 * | 1/2014 | Raynor et al. | 345/158 |
| 2014/0210770 A1 * | 7/2014 | Chen et al. | 345/174 |

FOREIGN PATENT DOCUMENTS

| | | | |
|---|---|---|---|
| CN | 201465046 | 5/2010 | |
| EP | 1073005 A1 | 1/2001 | |
| EP | 1437677 | 7/2004 | |
| EP | 2107445 A1 | 10/2009 | |
| EP | 2256600 A2 | 12/2010 | |
| GB | 2400713 A | 10/2004 | |
| WO | 2010/056177 | 5/2010 | G06F 3/042 |

OTHER PUBLICATIONS

M. Reigneau, U.S. Appl. No. 13/053,520, filed Mar. 22, 2011.

* cited by examiner

OPTICAL NAVIGATION DEVICE

FIELD OF THE INVENTION

The present disclosure relates to an optical navigation device for mobile electronic devices operated by moving an object on a surface.

BACKGROUND OF THE INVENTION

Current mobile or computer devices use a variety of different navigation mechanisms including trackball devices, multi-click joysticks and capacitance based touch pads. However, there may be problems associated with each of these. Trackballs and joysticks can be unreliable and relatively expensive to implement. In addition, capacitance based touch pads do not operate well if the finger is covered, for example, by a glove, and their size can be large in relation to the devices, such as mobile phones and PDAs.

Optical navigation devices may also operate on the same principles as optical mice by comparing successive frames of an area image. However, typical devices use light emitting diode (LED) light sources that may require collimation and imaging optics and may add thickness to the devices. There is therefore a desire to provide an optical navigation device which has a reduced thickness compared to typical devices and which operates in a safe manner. In addition, it is desirable that such a device be manufactured in a simple manner and with a low part count.

SUMMARY OF THE INVENTION

A first aspect of the present disclosure is directed to an optical navigation device comprising an image sensor with an imaging surface, a laser, and an optical waveguide layer having an exposed user surface and a total internal reflection (TIR) surface on the underside of the exposed user surface. The waveguide layer, the laser, and the image sensor may be together arranged to direct radiation emitted by the laser onto the imaging surface at least partly by total internal reflection by the TIR surface.

The laser radiation may be contained within the optical navigation device (primarily within the waveguide layer) unless an object (such as a human digit) comes into contact with the exposed user surface to frustrate the total internal reflection at the TIR surface. In this case, some laser radiation may escape from the device but may be absorbed by the object contacting the exposed user surface (with some of the radiation subsequently being scattered back into the waveguide layer). Therefore, whether an object is in contact with the exposed user surface or not, there is no risk of radiation escaping from the device in such a way that it would cause damage to a user's eyes. The device is thus safer, which is in contrast to the typical optical navigation device which continuously emits coherent laser radiation (potentially in the direction of the user's eyes).

In one embodiment, the optical waveguide layer may further comprise a first internal surface adapted to reflect radiation emitted by the laser towards the TIR surface. Additionally or alternatively, the optical waveguide layer may further comprise a second internal surface adapted to reflect radiation reflected by the TIR surface towards the imaging surface. In both cases, it is preferable that the internal surfaces are adapted to totally internally reflect the laser radiation. However, where this is not possible, for example, due to the geometry of the waveguide layer, a coating (e.g. aluminum) may be applied to the first and/or second internal surfaces to make them more reflective. Typically, the first and second internal surfaces are angled with respect to the principal optical axis of the radiation incident thereon.

As an alternative to providing a first internal surface adapted to reflect radiation emitted by the laser towards the TIR surface, the waveguide layer may be adapted to refract radiation emitted by the laser towards the TIR surface. In one embodiment, a first lens is provided over the laser, the first lens being configured to substantially collimate radiation emitted by the laser. By collimating the laser radiation, a more uniform illumination of the TIR surface by the laser radiation is achieved. This results in better performance of the navigation device.

Additionally or alternatively, a second lens may be positioned between the first lens and the laser. The second lens may be configured to expand the diameter of a radiation beam emitted by the laser. The second lens may be mounted on an upper surface of the laser. Where both the first and second lenses are provided, a gap may be provided between the first and second lenses. This may provide space for the radiation beam to expand after passing through the second lens before it is collimated by the first lens.

The second lens may be preferably positioned directly under the first lens (with or without a gap between them). In addition, the principle optical axes of the first and second lenses may be preferably parallel. In one embodiment, the principle optical axes of the first and second lenses are co-linear. Preferably, the principle optical axes of the first and/or second lenses may be substantially parallel to the principle optical axis of the radiation beam emitted by the laser.

The first lens may be formed separately from the waveguide layer, or the first lens may be integrally formed with the waveguide layer to minimize the thickness of the navigation device. In some embodiments, the first lens may comprise a Fresnel lens. Fresnel lenses are typically thinner than more traditional lenses having the same aperture and focal length. Therefore, by employing a Fresnel lens instead of a more traditional lens, the thickness of the device can be reduced, while retaining the benefits of collimation (see above).

The laser and image sensor of the device may be housed within separate compartments of a single sensor package. This may prevent any unwanted internal propagation of radiation from the laser to the image sensor within the sensor housing, without it first being reflected via the TIR surface.

A laser is employed rather than, for example, an LED as the radiation emitted is more coherent, i.e. although the photons emitted by the laser may be diverging, they are emitted in substantially the same direction. Therefore, any modification of the beam by frustrated TIR can be observed at any point along that beam without the need for imaging optics. This lack of imaging optics also means that the assembly process of the optical navigation device may not need to be as accurately assembled, i.e. low tolerance and easier assembly.

Any suitable laser may be used. For example, the laser may be a distributed feedback (DFB) laser. However, these lasers tend to be provided in relatively large modules. Therefore, the laser may comprise a vertical cavity surface emitting laser (VCSEL), which tends to have smaller chip-sized packages. The laser and image sensor may have principal optical axes which are parallel to each other. Alternatively, the laser and image sensor may have principal optical axes which are not parallel to each other. The waveguide layer may be monolithic. The waveguide layer may be provided over the laser and the imaging sensor.

In one embodiment, the optical navigation device may further comprise a magnifying lens adjacent the imaging surface. This may help to ensure that the entire imaging surface is illuminated so as to form a more reliable imaging pattern.

Additionally or alternatively, in another embodiment, a correction lens may be positioned over the imaging surface for correcting a magnification effect in the laser radiation reflected by the TIR surface. Typically, when frustrated total internal reflection occurs at the TIR surface, a magnification difference is observed at the imaging surface between the X and Y axes. This may be corrected by the correction lens. In one embodiment, the correction lens may be cylindrical. Additionally, or alternatively, the correction lens may be a Fresnel lens.

The greater the refractive index of the waveguide layer, the lower the critical angle for TIR (i.e. the angle between the laser radiation beam incident on the TIR surface and the normal to the TIR surface). Therefore, the greater the refractive index of the waveguide layer, the narrower (with respect to the incident direction of the laser radiation on the TIR surface) the waveguide layer can be. As miniaturization is a desire for optical navigation devices of this type, it may be preferable that the refractive index of the optical waveguide layer be as high as possible (preferably greater than 1.5, more preferably greater than 2). However, due to the increased cost of suitable materials with higher refractive indices, the optical waveguide layer may typically have a refractive index of between 1 and 2.

Another aspect of the present disclosure is directed to a method of operating an optical navigation device comprising an image sensor with an imaging surface, a laser, and an optical waveguide layer having an exposed user surface and a TIR surface on the underside of the exposed user surface. The method may comprise totally internally reflecting radiation emitted by the laser using the TIR surface, illuminating at least part of the imaging surface with the reflected radiation, bringing an object into contact with the exposed user surface for frustrated total internal reflection of at least a portion of the laser radiation at the TIR surface, and deriving user input information from changes in sequential image frames detected at the imaging surface.

Preferably, the method may further comprise moving the object across the exposed user surface. The object may be a human digit or a stylus. In one embodiment, the method may further comprise collimating radiation emitted by the laser. Typically, the radiation may be collimated by a Fresnel lens.

Additionally or alternatively, the method may further comprise expanding the diameter of a radiation beam emitted by the laser before collimating the radiation beam.

Another aspect of the disclosure is directed to an electronic apparatus comprising an optical navigation device that may have an image sensor with an imaging surface, a laser, and an optical waveguide layer having an exposed user surface and a TIR surface on the underside of the exposed user surface. The waveguide layer, laser, and image sensor may be together arranged to direct radiation emitted by the laser onto the imaging surface at least partly by total internal reflection by the TIR surface.

Another aspect of the disclosure is directed to a mobile communications device. The device may comprise an optical navigation device having an image sensor with an imaging surface, a laser, and an optical waveguide layer having an exposed user surface and a TIR surface on the underside of the exposed user surface. The waveguide layer, the laser, and the image sensor may be together arranged to direct radiation emitted by the laser onto the imaging surface at least partly by total internal reflection by the TIR surface.

BRIEF DESCRIPTION OF THE DRAWINGS

An embodiment of the present disclosure will now be described, by way of example only, with reference to the drawings, in which.

DETAILED DESCRIPTION OF THE PREFERRED EMBODIMENTS

Figure 1:
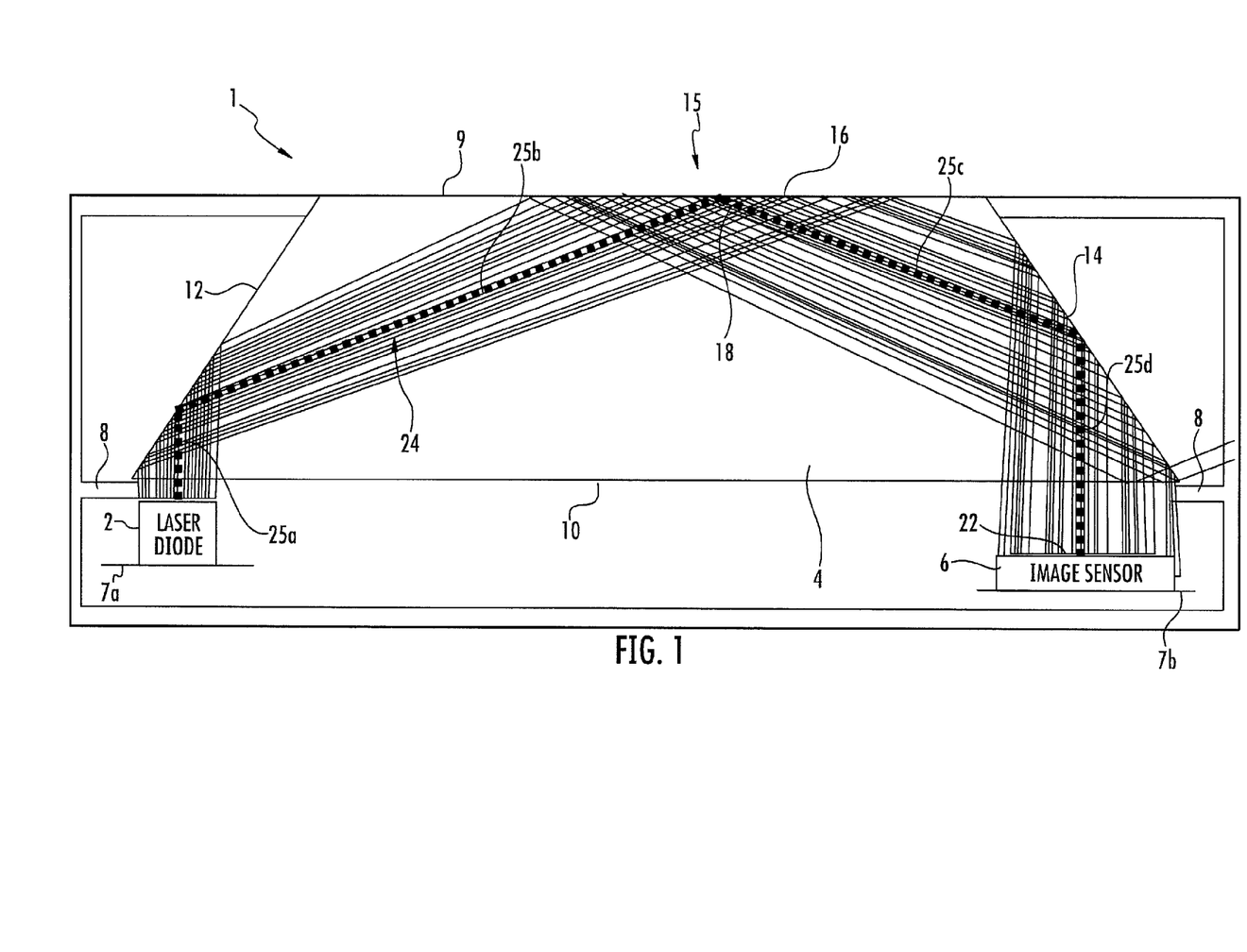
FIG. 1 is a side view of an optical navigation device, according to the present disclosure.
Figure 2:
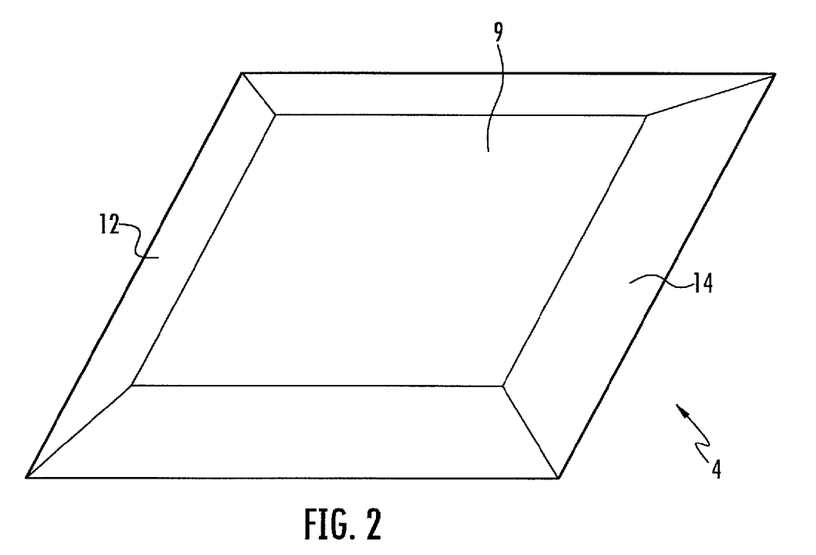
FIG. 2 is a schematic perspective view of the waveguide layer of the optical navigation device of FIG. 1.
Figure 7:
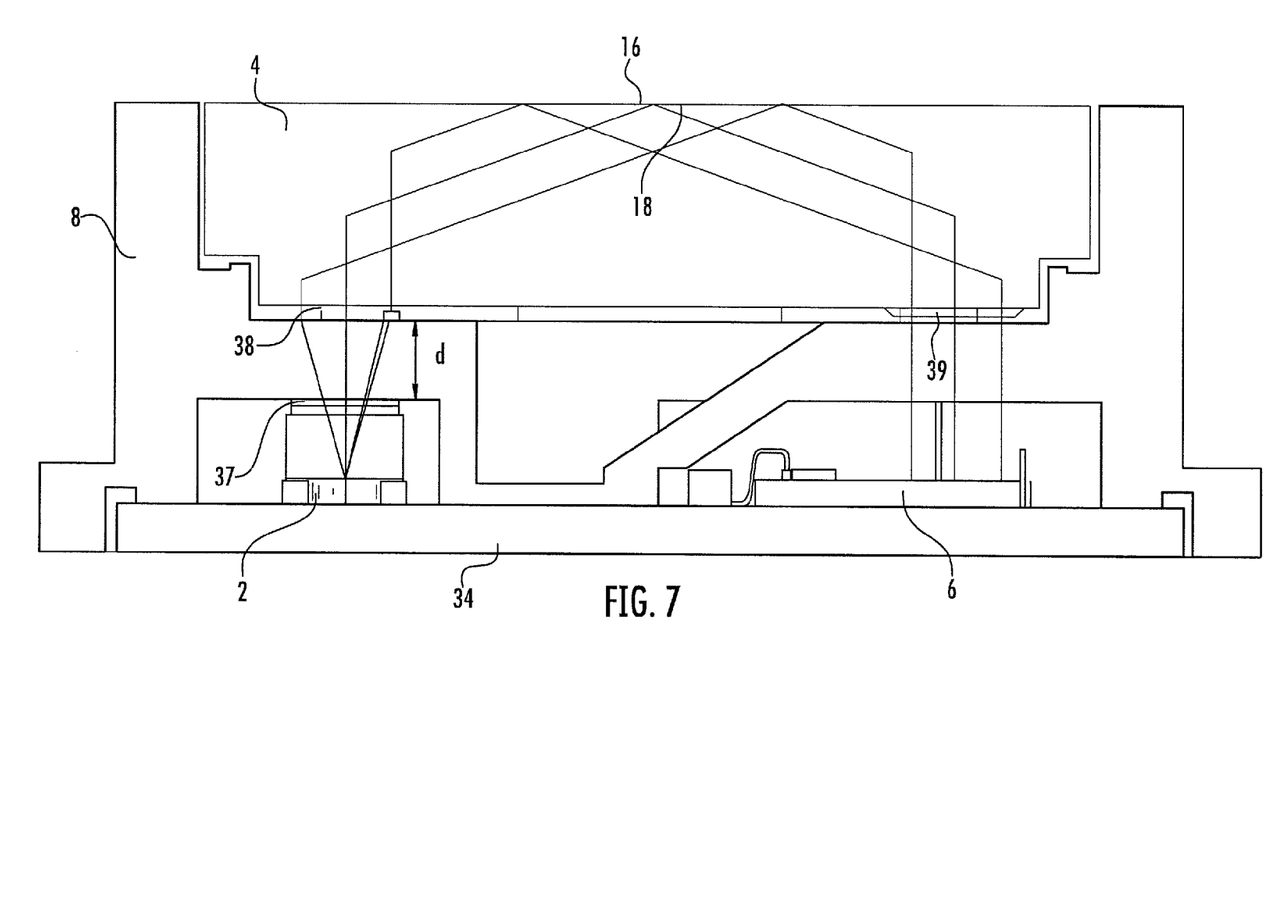
FIG. 7 is a side view of the device of FIG. 6, which in this case also comprises a correction lens over the image sensor.

FIG. 1 is a schematic side view of an optical navigation device 1 comprising a laser diode 2, an optical waveguide layer 4 and an image sensor 6. The laser diode 2 and image sensor 6 are mounted on separate circuit boards 7a, 7b, while the optical waveguide layer 4 is suspended above the circuit boards 7a, 7b by a supportive housing 8. It may be understood that the laser 2 and image sensor 6 may alternatively be mounted on the same circuit board (FIG. 7). As shown in FIGS. 1 and 2, the optical waveguide layer 4 comprises an upper, user input face 9 and a lower face 10 with a pair of angled side faces 12, 14 extending between them, the side faces 12, 14 converging towards each other as they extend from the lower face 10 to the upper face 9. A touch sensitive input pad 15 is formed at an intermediate region of the user input face 9 between the angled faces 12, 14. The input pad 15 has an exposed user (or "mousing") surface 16 (which is exposed to the ambient environment) and a TIR surface 18 (which is internal to the waveguide layer 4) on the underside (i.e. the reverse side) of the exposed user surface 16. The waveguide layer 4 typically has a refractive index in the range 1.5-2.0 and may be formed, for example, from polycarbonate (refractive index approximately 1.59).

The image sensor 6 has an imaging surface 22 comprising an array of pixels. In the illustrated embodiment, the array comprises a 20×20 array of 30 µm CMOS pixels. However, it may be understood that other array sizes/architectures may be employed and that any suitable alternative technology to CMOS (such as CCD) may be used in the pixels. The sensor further comprises a signal processor.

The laser 2, image sensor 6 and waveguide layer 4 are together arranged such that, when radiation 24 is emitted by the laser 2, it enters the waveguide layer 4 and is directed onto the imaging surface 22 of the image sensor 6 via the TIR surface 18 by total internal reflection. In one embodiment, the angled surfaces 12, 14 are also TIR surfaces. In this case, radiation is emitted by the laser 2 along a first principal optical axis 25a towards a first one of the angled faces 12 of the optical waveguide layer 4. The first angled face 12 then directs the radiation 24 towards the TIR surface 18 along a second principal optical axis 25b by total internal reflection. The radiation 24 is then totally internally reflected by the TIR surface 18 along a third principal optical axis 25c towards the second angled face 14. Finally, the second angled face 14 totally internally reflects the radiation 24 along a fourth principal optical axis 25d towards the imaging surface 22 of the image sensor 6. It may be understood that, in each case, the laser radiation is incident on the TIR surfaces at an angle greater than the critical angle for total internal reflection. It is also noted that the system of FIG. 1 is typically afocal, i.e. the laser radiation is not typically focused onto the image sensor 6.

As shown in FIG. 1, the waveguide layer 4 is arranged such that the radiation reflected by the side face 14 is not totally internally reflected by the lower face 10 of the waveguide layer 4. Rather, the radiation passes through the lower face 10 onto the imaging surface 22, thus causing substantially all of (or only some of, but preferably at least the majority of) the pixels of the pixel array to be illuminated.

In the embodiment shown in FIG. 1, the laser diode 2 and the image sensor 6 have principal optical axes 25a, 25d that are substantially parallel to each other. As such, the circuit boards 7a, 7b on which the laser 2 and image sensor 6 are mounted may be co-planar or alternatively they may be located on separate parallel planes.

As explained below, the position and surface area of the touch sensitive input pad 15 is defined by the area of the user input face 9 which is illuminated by the laser 2. This depends on the divergent angle of the laser beam (in this case approximately 10°), the angle at which the laser beam is incident on the first angled face 12, and the degree of incline of the first angled face 12 relative to the user input face 9. It may be understood that, in an alternative embodiment, the optical waveguide layer may be arranged such that the entire user input face 9 is illuminated by the laser radiation (and is thus touch sensitive).

In some cases, the geometry of the waveguide layer 4 (in particular the degree of incline of the angled faces 12, 14 relative to the principal optical axis 25a, 25c of the laser radiation incident thereon) may be such that the laser radiation is incident upon the angled faces 12, 14 at an angle less than the critical angle for total internal reflection. In this case, a reflective coating (e.g. aluminum) may be applied to the angled faces 12, 14 to increase their reflectivity so that they can reflect the radiation emitted by the laser towards the input pad 15 and the image sensor 6 respectively.

Figure 3:
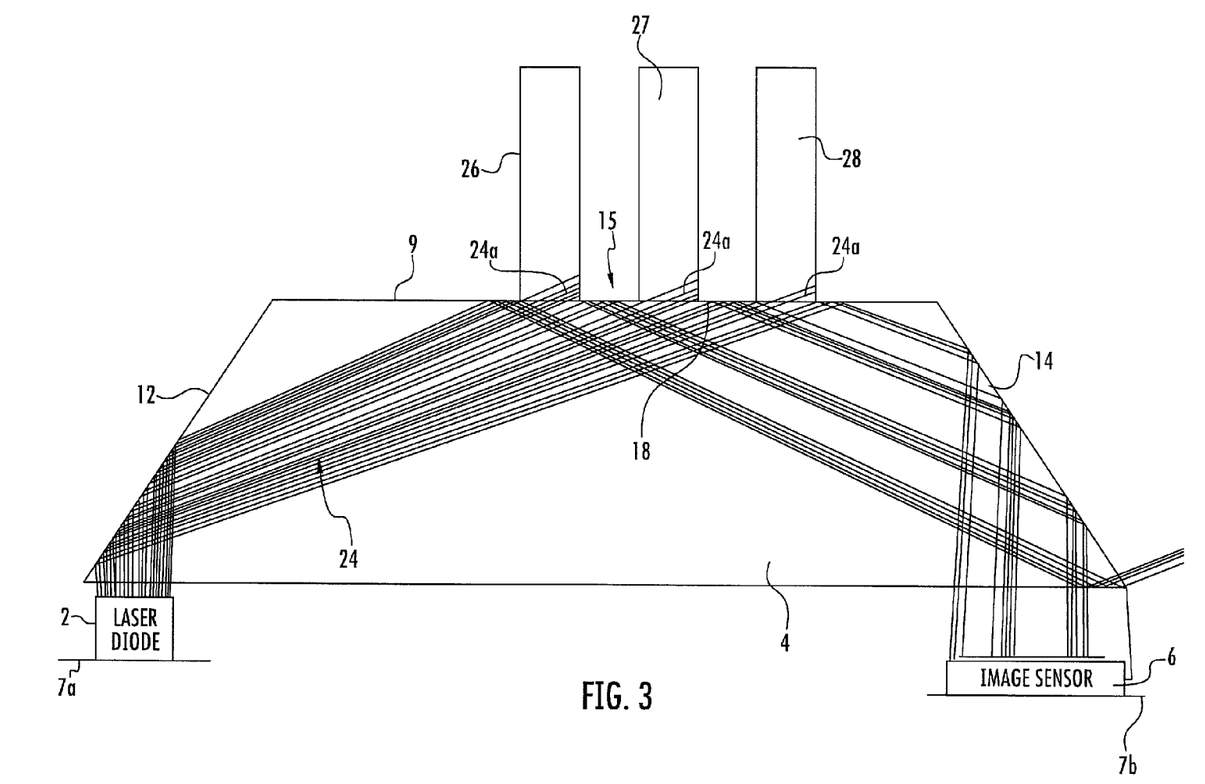
FIG. 3 is a side view similar to FIG. 1 but further including an object touching an exposed user surface of the device.

As mentioned above, total internal reflection by the TIR surface 18 of the input pad 15 (and by the angled faces 12, 14) is possible because the laser radiation beam is incident on the TIR surface(s) at an angle greater than the critical angle for total internal reflection. The critical angle ($\theta_c = \sin^{-1}(n2/n1)$) is dependent on the refractive index (n1) of the waveguide layer 4 and the refractive index (n2) of the ambient air on the exposed user surface 16. However, as shown in FIG. 3, when a human digit, such as a finger or a thumb (which has a larger refractive index than the ambient air) touches the exposed user surface 16, the ridges 26-28 of the finger (or thumb) print frustrate the total internal reflection (F-TIR) at the TIR surface 18. That is, as shown in FIG. 3, the portion 24a of radiation 24 which is incident on the TIR surface 18 directly beneath where the digit contacts the exposed user surface 16 is no longer totally internally reflected and instead escapes from the waveguide layer 4. This occurs because the increased refractive index (compared to that of the ambient air) of the digit touching the exposed user surface 16 increases the critical angle for total internal reflection above the angle of incidence of the laser radiation beam.

Although not shown in FIG. 3, a portion (typically around 10%) of the escaped radiation 24a is scattered off the digit back into the waveguide layer 4 towards the second angled face 14 and onto the imaging surface 22. In addition, any radiation which does not undergo frustrated total internal reflection (F-TIR) is directed onto the imaging surface as before. However, less radiation is incident on the image sensor when a digit is in contact with the input pad 15, resulting in fewer of the pixels in the pixel array being illuminated. This causes an image pattern 30 to be formed on the imaging surface 22.

Figure 5:
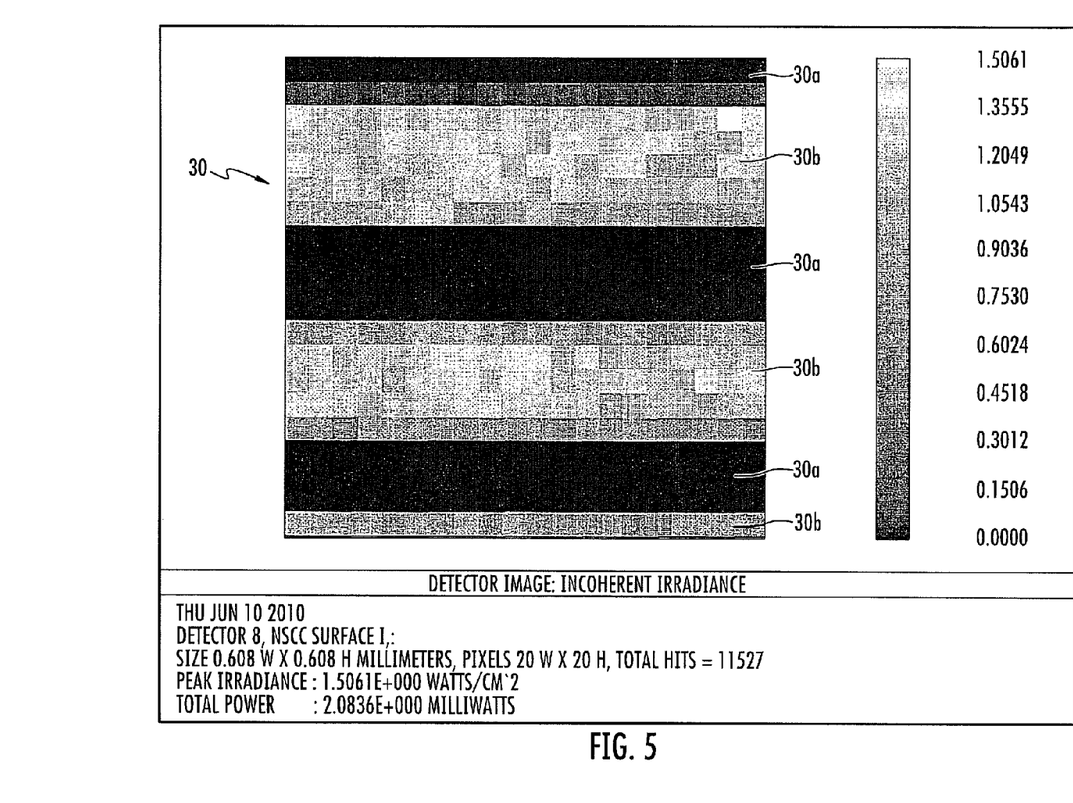
FIG. 5 shows an image pattern produced by the image sensor when an object touches the exposed user surface when the device of FIG. 1 is in use.

An exemplary image pattern is shown in FIG. 5. In this case, a 20×20 pixel array (which in total has a width of 0.608 mm and a height of 0.608 mm) is illuminated with a peak irradiance of 1.5 W/cm$^2$ and a total power of 2.1 mW. The frustrated total internal reflection (caused by the digit ridges touching the exposed user surface) at the TIR surface 18 results in the detection of an image pattern comprising a series of dark and illuminated regions 30a, 30b.

The navigation device 1 is operated by sliding a digit 28 across the touch sensitive exposed user surface 16 and user input information is derived from changes in sequential image frames detected at the imaging surface. In particular, as the digit 28 moves across the surface, the position of F-TIR on the input pad 15 changes and the image pattern formed on the imaging surface 22 changes accordingly. The signal processor of the sensor processes successive image patterns to identify the point or points of contact of the digit on the exposed user surface 16 and to determine motion vectors and the rate of movement of one or more features from one frame to the next. The motion vectors and rate of movement can then be translated into an appropriate control action for a mobile communications device or mobile computer, for example. The device may work at a frame rate of 1 kHz to 10 kHz in order to detect relative movement or movements of one or more features at the exposed user surface 16 of the input pad 15. The frame rate is set by the refresh rate of the sensor. The exposure may be achieved by a pulsating laser source or by sampling the sensor output at the required rate. The features detected by the sensor may be between around 0.5 mm and 30 μm in size. The smaller features provide a greater ability to detect motion than the larger ones.

It may be possible to calibrate the sensor by determining the sensor illumination when the laser diode 2 is turned off and comparing this with the sensor illumination when the laser diode 2 is on. This calibration may occur at the start of each use of the optical navigation device or on a frame to frame basis.

Figure 4:
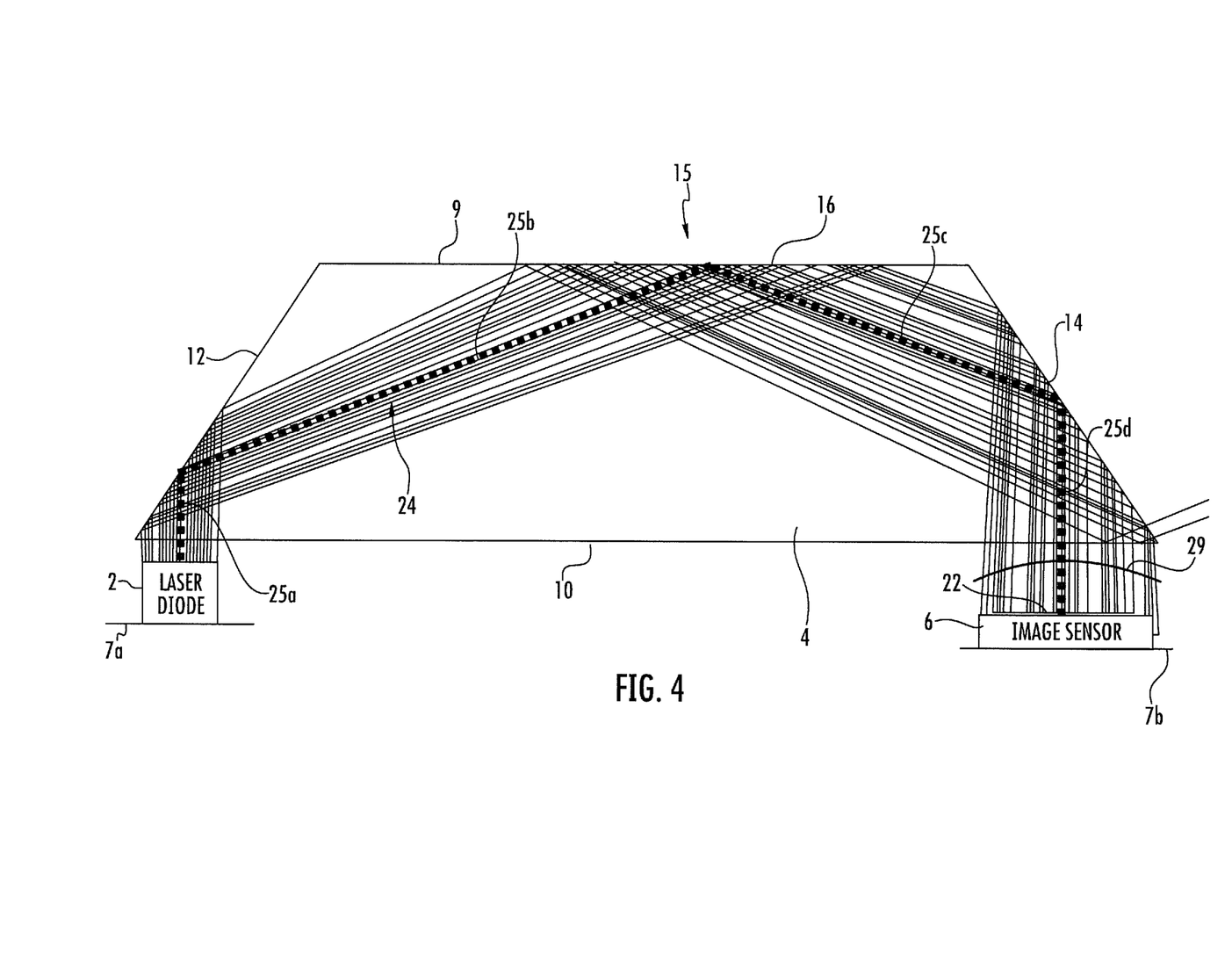
FIG. 4 is a side view similar to FIG. 1, but further including a magnifying lens adjacent (in this case positioned over) the image sensor of the device.

As the radiation beam emitted by the laser diode has low beam divergence (less than 10° typically), no collimation or imaging optics may be required. This allows the navigation device to be much thinner than typical devices which use optics, such as lenses and collimators. It also reduces part count and makes manufacturing thereof easier. However, depending on the geometry of the device, it may be necessary/beneficial to include a magnifying lens 29 (see FIG. 4) between the waveguide layer 4 and the imaging surface 22 to ensure that the entire imaging surface is illuminated so as to form a reliable imaging pattern. In the embodiment shown in FIG. 4, the magnifying lens 29 is convex with respect to the incident direction of the laser radiation.

Figure 6:
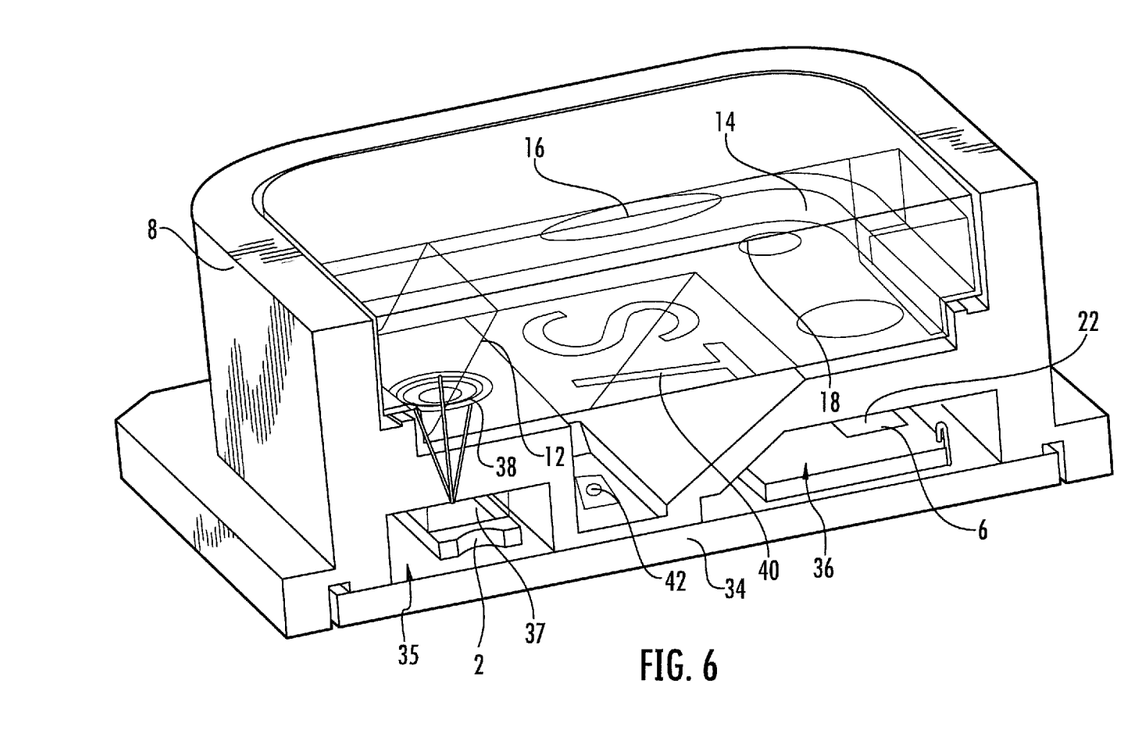
FIG. 6 is a perspective section view of an alternative embodiment of the optical navigation device comprising a Fresnel collimating lens, according to the present disclosure.
Figure 8:
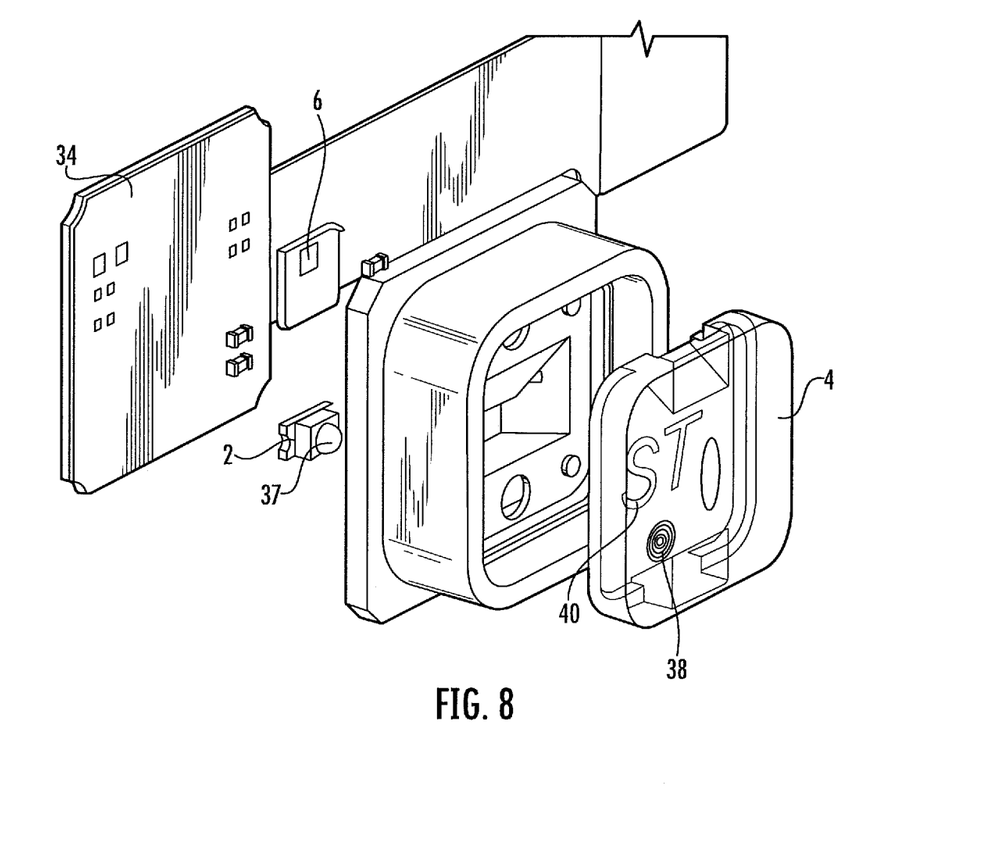
FIG. 8 is an exploded view of the device of FIG. 6.

FIGS. 6 to 8 show an alternative embodiment of the optical navigation device 1. The embodiment of FIGS. 6 to 8 is similar to that described in FIGS. 1 to 4, and identical features are given the same reference numerals. In this case, the laser 2 and image sensor 6 are mounted on a common circuit board 34 and housed within separate compartments 35, 36 respectively of the housing 8. A beam expanding hemispherical lens 37 (shown most clearly in FIG. 8) is provided over the emitting surface of the laser 2 to increase the diameter of the radiation beam emitted by the laser 2. The lens 37 is typically mounted on an upper surface of the laser 2, as shown in FIG. 8. A collimating Fresnel lens 38 is provided over the beam expanding lens 37 to collimate the expanded laser radiation beam before it is totally internally reflected by the first angled internal surface 12 of the waveguide layer 4 towards the TIR surface 18. A vertical gap 'd' (most clearly illustrated in the side view of FIG. 7) is provided between the beam expanding lens 37 and the collimating Fresnel lens 38 to allow the beam diameter to be expanded before it is collimated. This ensures that the laser radiation illuminates a sufficient amount of the TIR surface 18, which in turn makes a sufficient amount of the exposed user surface 16 touch sensitive.

The collimating lens 38 increases the uniformity of illumination of the TIR surface 18. This improves the contrast between these parts of the image detected by the image sensor where FTIR has occurred and those parts of the image where FTIR has not occurred. This in turn improves the performance of the optical navigation device 1 as the signal processor can more accurately detect the location of FTIR in successive image frames.

It may be understood that, as the Fresnel lens 38 is significantly thinner than more traditional lenses having the same aperture and focal length, the thickness of the housing 8 does not need to be significantly increased to accommodate it. Furthermore, the collimating lens 38 may also eliminate any need for a magnifying lens 29 to be provided over the image sensor 6 (although it may be understood that neither a Fresnel lens nor a magnifying lens may be required). As the Fresnel collimating lens 38 is typically thinner than a traditional magnifying lens 29, this design may allow the thickness of the housing 8 to be reduced.

Optionally, the collimating lens 38 may be formed separately from the waveguide 4 and attached thereto with transparent adhesive. Alternatively, the collimating lens 38 may be integrally formed with the waveguide 4.

It may be understood that, when the radiation beam emitted by the laser 2 is incident on the TIR surface 18, it becomes "stretched" (i.e. it becomes oval rather than circular in cross section) compared to where it is incident on the first angled side face 12. When there is no frustrated TIR, this "stretching" is corrected by the second angled side face 14 (which preferably has the same angle of inclination with respect to the user input face 9 as the first angled face 12) before it is incident on the image sensor 6 (i.e. the beam has a circular cross section when it is incident on the image sensor 6). However, when frustrated total internal reflection occurs at the exposed user surface 16 (when the beam is stretched), not all of the beam "stretching" is corrected and a magnification difference occurs between the X and Y directions of the modified laser image incident on the image sensor 6. This is because the laser radiation beam is modified in its stretched state. Optionally, a correction lens 39 may be provided above the image sensor 6 to correct this magnification difference. This is shown in FIG. 7. The correction lens is typically cylindrical and may (or may not) be a Fresnel lens. As above, the Fresnel type lens is preferred as it is significantly thinner than more traditional lenses having the same aperture and focal length. In addition, the correction lens may be integrally formed with the waveguide layer 4 or, alternatively, formed separately from the waveguide layer 4 and attached thereto by transparent adhesive.

Also shown in FIGS. 6 and 8 is a logo 40 which is provided on a center portion of the lower face 10 of the waveguide layer 4 directly under the exposed user surface 16. The logo 40 is recessed into the lower face 10 of the waveguide layer 4 to a depth of approximately 30-50 µm. Typically, the logo 40 is formed by molding the lower face 10 against a mould tool comprising a raised logo template formed on the mould tool by spark erosion. Spark erosion also causes a surface roughness or "texture" to be applied to the raised logo template on the mould tool. This surface roughness (or texture) causes a similar texture to be applied to one or more recessed surfaces of the logo 40 during molding. A visible light source 42 (FIG. 6), such as a LED, is also provided on the circuit board 34 between the laser 2 and the image sensor 6. The LED 42 is arranged such that its principle optical emission axis is aligned with both the logo 40 and the exposed user surface 16. Light emitted by the LED 42 is thus directed towards the logo 40. Light incident on the textured part(s) of the logo 40 is scattered, while light which is incident on any non-textured parts of the logo or the surrounding (non-textured) region of the lower face 10 is transmitted through the waveguide 4 substantially un-attenuated. The logo 40 may thus appear to glow to a user of the navigation device through the exposed user surface 16, and can therefore be used, for example, for advertising and/or aesthetic purposes.

It may be understood that some visible light emitted by the LED 42 may be reflected by TIR surface 18 (or by the angled faces 12, 14) rather than exiting the device through the exposed user surface 16. However, only a minimal amount of visible light is typically reflected back onto the image sensor 6. This is explained as follows. As the radiation emitted by the laser 2 is collimated by the collimating lens 38, the laser radiation travels along a well defined optical path within the housing 8, and is incident on the image sensor 6 at a specific angle of incidence. The image sensor housing compartment 36 is arranged to restrict the viewing cone of the image sensor 6 to a narrow range of viewing angles around this specific angle of incidence. This narrow viewing cone minimizes the amount of unwanted reflected LED light captured by the image sensor 6, without reducing the amount of laser radiation captured. Therefore, the laser image detected by the image sensor 6 is not significantly distorted (typically) by the reflected LED light.

To provide added protection against distortion of the laser image by reflected LED light (or indeed by ambient radiation incident on the exposed user surface 16), a selective wavelength optical filter may optionally be provided over the image sensor 6 (i.e. a filter which transmits the, typically infrared, laser radiation and blocks visible radiation).

It is noted that, instead of a user's digit, any other suitable object (for example, a glove or stylus) may be used to provide the input by causing F-TIR. Such an object should have a refractive index (which is greater than 1, more preferably greater than 1.5, and most preferably greater than the refractive index of the waveguide layer 4) that is sufficiently large to increase the critical angle above the angle of incidence of the laser radiation beam on the TIR surface 18.

Although the upper, input face 9 is shown as being substantially flat in FIGS. 1-4 and in FIG. 6, it is noted that, for ergonomic reasons, it may be preferable for the upper, input face to be curved so as to form a dome protruding from the top of the optical navigation device.

Figure 9:
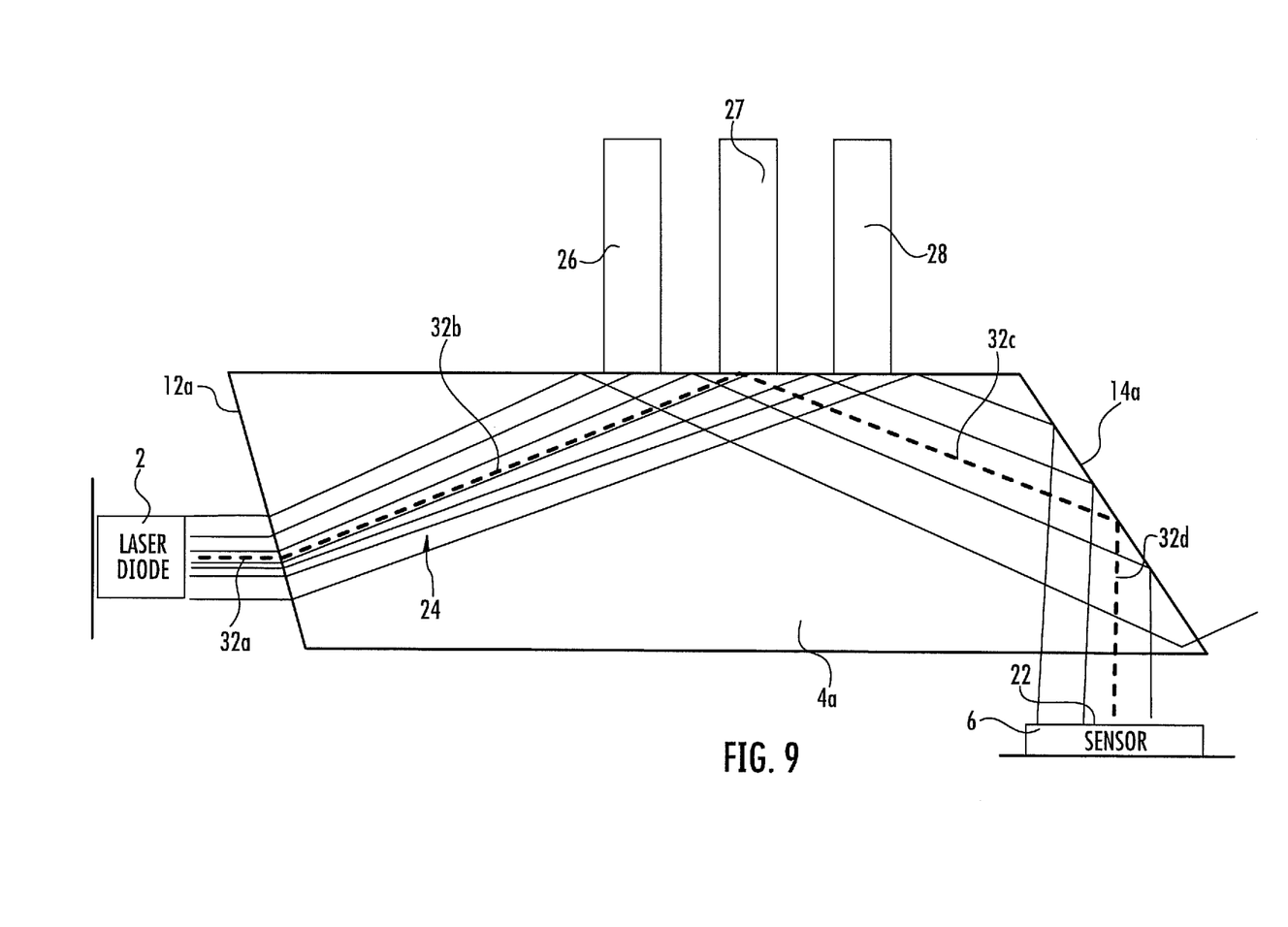
FIG. 9 shows another alternative embodiment of the optical navigation device of FIGS. 1 and 2 where the laser and image sensor have principal optical axes which are oriented at approximately 90° to each other.

FIG. 9 shows an alternative embodiment of the optical navigation device 1 that comprises an alternative waveguide layer 4a. The waveguide layer 4a is similar to the waveguide layer 4 of the optical navigation device 1 described above. However, in this case, the angled side faces 12a, 14a are substantially parallel to each other. In addition, the laser diode 2 is mounted on a plane which is perpendicular to the plane on which the image sensor 6 is mounted. It may be understood that, if the laser diode 2 and image sensor 6 are to be mounted on the same circuit board, it may be flexible to allow the laser 2 and sensor 6 to be mounted on perpendicular planes.

In the embodiment shown in FIG. 9, radiation 24 is emitted by the laser 2 along a first principal optical axis 32a towards the first angled side face 12a. The first side face 12a is angled with respect to the principal optical axis 32a of the laser radiation such that, when the radiation enters the waveguide layer 4a (which has a larger refractive index than the air or vacuum between the laser diode 2 and the waveguide layer 4a), the radiation is refracted along a second principal optical axis 32b towards the TIR surface 18a. The radiation is then totally internally reflected by the TIR surface 18a along a third principal optical axis 32c towards the second angled face 14a. Finally, the second angled face 14a totally internally reflects the radiation 24 along a fourth principal optical axis 32d towards the imaging surface 22 of the image sensor 6. User input is provided to the optical navigation device 1a by frustrated total internal reflection as described above. It may be understood that, as above, where it is not possible to achieve an angle greater than the critical angle, a reflective aluminum coating may be applied to the side face 14a to improve its reflectivity. If an angle greater than the critical angle is achieved, preferably no aluminum coating is applied to the side face 14a as its reflectivity is greater in the absence of such a coating.

As the laser diode 2 and the image sensor 6 are mounted on perpendicular planes, they have principal optical axes 32a, 32d which are substantially perpendicular to each other. However, it may be understood that any angle may be formed between the principal optical axes 32a, 32d as long as the laser 2, waveguide layer 4 and image sensor 6 are together arranged to direct radiation emitted by the laser onto the imaging surface 22 at least partly by total internal reflection of the laser radiation 24 by the TIR surface 18a.

Typically (but not exclusively), in each of the embodiments described above, the laser diode may be a VCSEL which preferably emits invisible infrared (or ultraviolet) radiation so as not to distract the user. Alternatively, the laser may emit visible light, in which case a small amount of visible light may leak, when the device is operated, in the vicinity of the user's digit.

Because of the small thickness of device which can be achieved with the optical navigation device, this device may be particularly useful in hand-held mobile apparatus, such as phones, PDAs and personal music players. The optical navigation device is also useful in computers (especially laptops and notebooks), remote controls, game controllers, and mice.

Figure 10:
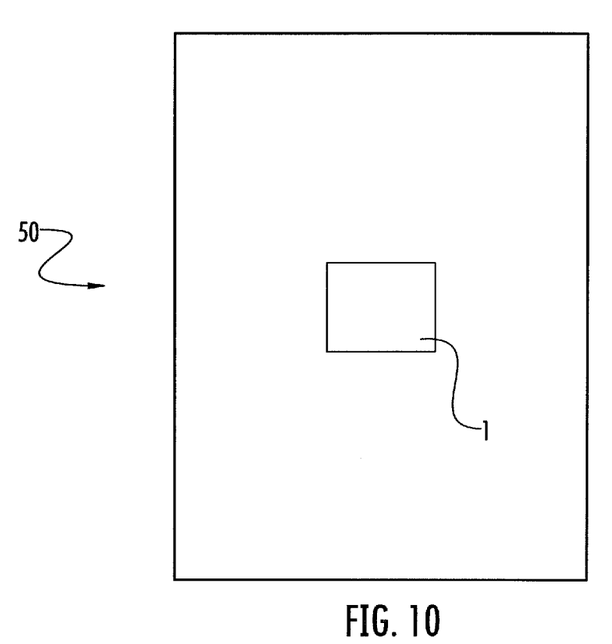
FIG. 10 shows an electronic apparatus comprising an optical navigation device, according to the present disclosure.

FIG. 10 illustrates an electronic apparatus 50 comprising an optical navigation device 1 according to any of the above described embodiments of the disclosure. In one embodiment, the electronic apparatus 50 may be a mobile communications device such as a mobile phone or a personal data assistant.

While this detailed description has set forth some embodiments of the present disclosure, the appended claims cover other embodiments of the present disclosure which may differ from the described embodiments according to various modifications and improvements.

That which is claimed is:

1. An optical navigation device comprising:
an image sensor having an imaging surface;
a laser; and
an optical waveguide layer having an exposed user surface and a total internal reflection (TIR) surface on an underside of the exposed user surface;
said optical waveguide layer, said laser, and said image sensor being configured to at least partly direct radiation emitted by said laser onto the imaging surface by total internal reflection via the TIR surface;
said optical waveguide layer comprising
a first internal surface configured to reflect the radiation emitted by said laser to the TIR surface, and
a second internal surface aligned at an angle to the TIR surface and over said imaging surface, said second internal surface configured to totally internally reflect radiation from the TIR surface to the imaging surface.

2. The optical navigation device of claim 1 wherein said first internal surface is configured to totally internally reflect the laser radiation.

3. The optical navigation device of claim 1 further comprising a first lens over said laser and configured to collimate the radiation emitted by said laser.

4. The optical navigation device of claim 3 further comprising a second lens between said first lens and said laser and configured to expand a diameter of the radiation emitted by said laser.

5. The optical navigation device of claim 4 further comprising a gap between said first and second lenses.

6. The optical navigation device of claim 4 wherein optical axes of said first and second lenses are substantially parallel.

7. The optical navigation device of claim 4 wherein optical axes of said first and second lenses are co-linear.

8. The optical navigation device of claim claims 4 wherein optical axes of said first and second lenses are substantially parallel with an optical axis of the radiation emitted by said laser.

9. The optical navigation device of claim 3 wherein said first lens is integral with said optical waveguide layer.

10. The optical navigation device of claim 3 wherein said first lens comprises a Fresnel lens.

11. The optical navigation device of claim 1 further comprising a sensor housing including compartments therein; and wherein said laser and said image sensor are carried by separate compartments of said sensor housing.

12. The optical navigation device of claim 1 wherein said optical waveguide layer is over said laser and said image sensor.

13. The optical navigation device of claim 1 wherein said laser comprises a vertical cavity surface emitting laser (VCSEL).

14. The optical navigation device of claim 1 wherein said laser and said image sensor have optical axes that are substantially parallel to each other.

15. The optical navigation device of claim 1 further comprising a magnifying lens positioned over the imaging surface.

16. The optical navigation device of claim 1 further comprising a correction lens positioned over the imaging surface for correcting a magnification effect in radiation reflected by the TIR surface.

17. The optical navigation device of claim 16 wherein said correction lens comprises a cylindrical correction lens.

18. The optical navigation device of claim 16 wherein said correction lens comprises a Fresnel lens.

19. The optical navigation device of claim 1 wherein said optical waveguide layer has a refractive index greater than 1.

20. The optical navigation device of claim 1 wherein said optical waveguide layer has a refractive index greater than 1.5.

21. The optical navigation device of claim 1 wherein said optical waveguide layer is configured to refract radiation emitted by said laser towards the TIR surface.

22. A method of operating an optical navigation device comprising an image sensor having an imaging surface, a laser, and an optical waveguide layer, the optical waveguide layer having an exposed user surface, a total internal reflection (TIR) surface on an underside of the exposed user surface, a first internal surface, and a second internal surface aligned at an angle to the TIR surface and over the imaging surface, the method comprising:
  totally internally reflecting radiation emitted by the laser using the TIR surface, the first internal surface to reflect the radiation emitted by the laser to the TIR surface;
  illuminating at least a portion of the imaging surface with the reflected radiation, the second internal surface totally internally reflecting radiation from the TIR surface to the imaging surface;
  bringing an object into contact with the exposed user surface to frustrate total internal reflection of at least a portion of the laser radiation at the TIR surface; and
  deriving user input information from changes in sequential image frames detected at the imaging surface.

23. The method of claim 22 further comprising moving the object across the exposed user surface.

24. The method of claim 22 wherein the object comprises at least one of a human finger and a stylus.

25. The method of claims 22 further comprising collimating the radiation emitted by the laser with a Fresnel lens.

26. The method of claim 25 further comprising expanding a diameter of the radiation emitted by the laser before collimating the radiation with the Fresnel lens.

27. An electronic apparatus comprising:
  an optical navigation device comprising
    an image sensor having an imaging surface,
    a laser, and
    an optical waveguide layer having an exposed user surface and a total internal reflection (TIR) surface on an underside of the exposed user surface,
    said optical waveguide layer, said laser, and said image sensor being configured to at least partly direct radiation emitted by said laser onto the imaging surface by totally internally reflection via the TIR surface;
    said optical waveguide layer comprising
      a first internal surface configured to reflect the radiation emitted by said laser to the TIR surface, and
      a second internal surface aligned at an angle to the TIR surface and over said imaging surface, said second internal surface configured to totally internally reflect radiation from the TIR surface to the imaging surface.

28. The electronic apparatus of claim 27 wherein the first internal surface is configured to totally internally reflect the laser radiation.

29. The electronic apparatus of claim 27 further comprising a first lens over said laser and configured to collimate the radiation emitted by said laser.

30. The electronic apparatus of claim 29 further comprising a second lens between said first lens and said laser and configured to expand a diameter of the radiation emitted by said laser.

31. The electronic apparatus of claim 29 further comprising a mobile wireless communications device cooperating with said optical navigation device.

* * * * *